(12) United States Patent
Taylor

(10) Patent No.: US 10,959,573 B2
(45) Date of Patent: Mar. 30, 2021

(54) ROLL-UP BARBEQUE GRILL

(71) Applicant: Jeffrey Taylor, Muncie, IN (US)

(72) Inventor: Jeffrey Taylor, Muncie, IN (US)

( * ) Notice: Subject to any disclaimer, the term of this patent is extended or adjusted under 35 U.S.C. 154(b) by 95 days.

(21) Appl. No.: 16/191,662

(22) Filed: Nov. 15, 2018

(65) Prior Publication Data

US 2019/0150665 A1 May 23, 2019

Related U.S. Application Data

(60) Provisional application No. 62/589,629, filed on Nov. 22, 2017.

(51) Int. Cl.
*A47J 37/07* (2006.01)

(52) U.S. Cl.
CPC .... *A47J 37/0763* (2013.01); *A47J 2037/0777* (2013.01)

(58) Field of Classification Search
CPC ........................ A47J 37/0763; A47J 2037/0777
USPC ............... 126/25 R, 25 A, 29, 30; 219/465.1
See application file for complete search history.

(56) References Cited

U.S. PATENT DOCUMENTS

| | | | | |
|---|---|---|---|---|
| 3,281,578 A | * | 10/1966 | Chapman, Jr. | C03C 17/06 219/528 |
| 4,431,908 A | * | 2/1984 | Fischer | H05B 3/688 219/465.1 |
| 4,574,186 A | * | 3/1986 | Sakai | H05B 3/36 219/528 |
| 5,399,439 A | * | 3/1995 | Rasmussen | A47J 37/0786 126/25 R |
| 5,452,706 A | * | 9/1995 | Meza | A47J 37/0763 126/29 |
| 6,149,711 A | * | 11/2000 | Lane | C22B 3/02 266/101 |
| 2008/0264404 A1 | * | 10/2008 | Hoyles | A47J 37/0736 126/25 R |
| 2016/0165670 A1 | * | 6/2016 | Toh | H05B 6/10 219/649 |
| 2017/0307225 A1 | * | 10/2017 | Curtis | F24C 15/107 |
| 2019/0150664 A1 | * | 5/2019 | Ramirez | A47J 37/0763 |

* cited by examiner

*Primary Examiner* — Avinash A Savani

(57) ABSTRACT

A roll-up barbeque grill is provided. The roll-up barbeque grill may provide a base substrate having spaced apart valleys formed therein separated by spaced apart heating elements coupled to the base substrate so that the base substrate may be rolled between a flat condition for grilling and a rolled condition for convenient storage and transportation. The heating elements are electrically powered for cooking food thereon. The valleys act as grease catchers during cooking as well as provide space for the heating elements to nest into in the rolled condition.

6 Claims, 4 Drawing Sheets

ROLL-UP BARBEQUE GRILL

CROSS-REFERENCE TO RELATED APPLICATION

This application claims the benefit of priority of U.S. provisional application No. 62/589,629, filed 22 Nov. 2017, the contents of which are herein incorporated by reference.

BACKGROUND OF THE INVENTION

The present invention relates to food preparation devices and, more particularly, to a roll-up barbeque grill.

Barbeque grills tend to be bulky as space is required for the heat source operatively associated to the food-cooking grill portion. The heat source, be it biomass (coal) or in the form of a gas (requiring a gas tank), also tends to take up space and demand additional bulk (for example, a cavity for the coals). Generally, and especially when transporting for outdoor activities, such as camping or tailgating, this bulk takes up precious storage space and adds weight that needs to be carried. In other words, current barbeque grills take up a lot of space when not in use and are very difficult to transport.

As can be seen, there is a need for a roll-up barbeque grill. The base of the roll up barbecue grill embodied in the present invention may be silicone-based, enabling an intrinsic electrical heat source, which essentially eliminates the space needed for traditional grills' heat sources, and so makes the present invention lighter as well. Moreover, the present invention may be dimensioned and adapted to roll between a flat condition and a rolled condition, further saving space and providing a convenient condition to store or transport the device. The flat condition can be used on any surface and is structured to produce less smoke when cooking food.

SUMMARY OF THE INVENTION

In one aspect of the present invention, a roll-up barbeque grill, includes the following: a base substrate having opposing first and second surface generally planar surfaces; a plurality of spaced apart valleys defined by the second surface in a flat condition; a plurality of heating element connected to the second surface, each heating element disposed between adjacent valleys of the plurality of spaced apart valleys; a void between each adjacent heating element in the flat condition; and the base substrate rollable between the flat condition and a rolled condition, wherein said heating elements move so as to decrease a volume of an adjacent void.

In another aspect of the present invention, the roll-up barbeque grill includes the following: a base substrate having opposing first and second surface generally planar surfaces; a plurality of spaced apart valleys defined by the second surface in a flat condition; a plurality of heating element connected to the second surface, each heating element disposed between adjacent valleys of the plurality of spaced apart valleys, wherein each valley and heating element is generally coextensive with a width of the second surface; a non-stick material substantially covering each heat element; a void between each adjacent heating element in the flat condition; the base substrate rollable between the flat condition and a rolled condition, wherein said heating elements move so as to decrease a volume of an adjacent void; two rail caps, each rail cap dimensioned to receive one of the two distal ends of each heating elements, wherein each rail cap is molded into the base substrate; a rail plate between each heating element; and a heat resistant second substrate coupled to the base substrate, the second substrate disposed between the first and second surfaces.

These and other features, aspects and advantages of the present invention will become better understood with reference to the following drawings, description and claims.

DETAILED DESCRIPTION OF THE INVENTION

Figure 1:
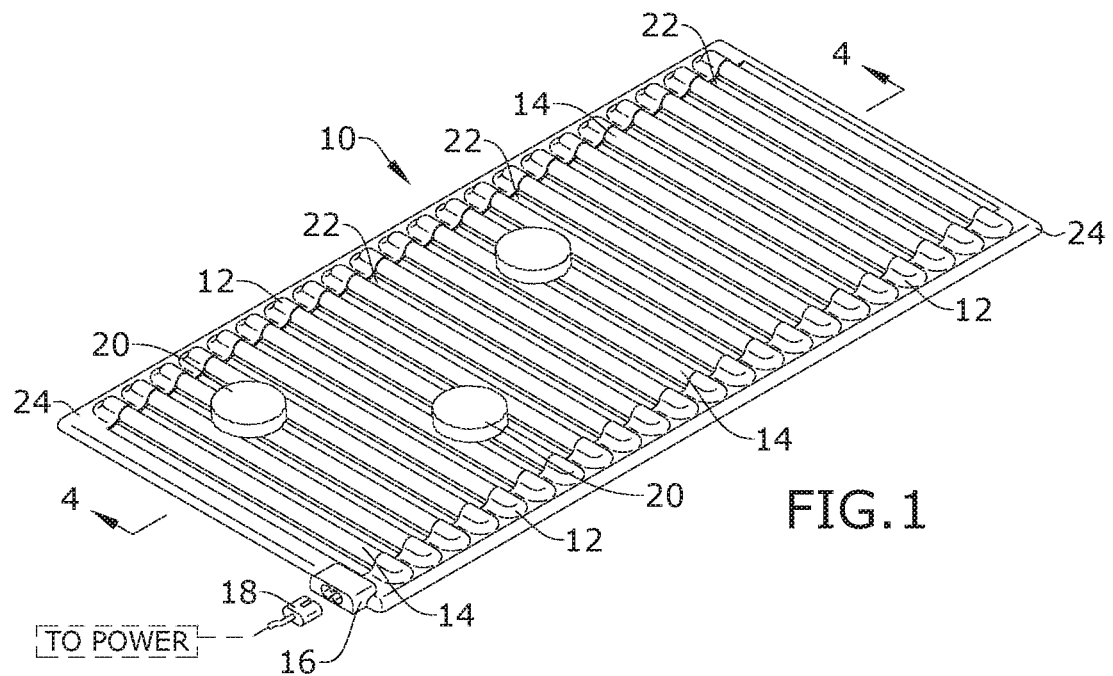
FIG. 1 is a perspective view of an exemplary embodiment of the present invention, shown in use, demonstrating a flat condition.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a roll-up barbeque grill. The roll-up barbeque grill may provide a base substrate having spaced apart valleys formed therein separated by spaced apart heating elements coupled to the base substrate so that the base substrate may be rolled between a flat condition for grilling and a rolled condition for convenient storage and transportation. The heating elements are electrically powered for cooking food thereon. The valleys act as grease catchers during cooking as well as provide space for the heating elements to nest into in the rolled condition.

Referring to FIGS. 1 through 6, the present invention may include a roll-up barbeque grill 10. The roll-up barbeque grill 10 may include a base substrate 24 that provides a generally planar sheet-like configuration. The base substrate 24 may be made from a material that provides a high thermal conductivity yet also enables a planar configuration thereof to be rolled up as disclosed herein. The material of the base substrate 24 may be silicone or similar materials. The base substrate 24 may provide opposing surfaces, a first surface 241 and a second surface 242. The first surface 241 may be generally planar or flat in certain configurations. The second surface 242 may include spaced apart linear troughs or valleys 22. The shape of each valley 22 may be generally semi-circular, as seen in the illustrations.

Every other valley 22 may contain a cylindrical heating element 28. Each heating element 28 may be substantially surrounded or coated with a non-stick material 26. The non-stick material, such as ceramics, Teflon™ or the like, may have non-stick properties with respect to food stuff and other residual or particulate matter.

Figure 2:
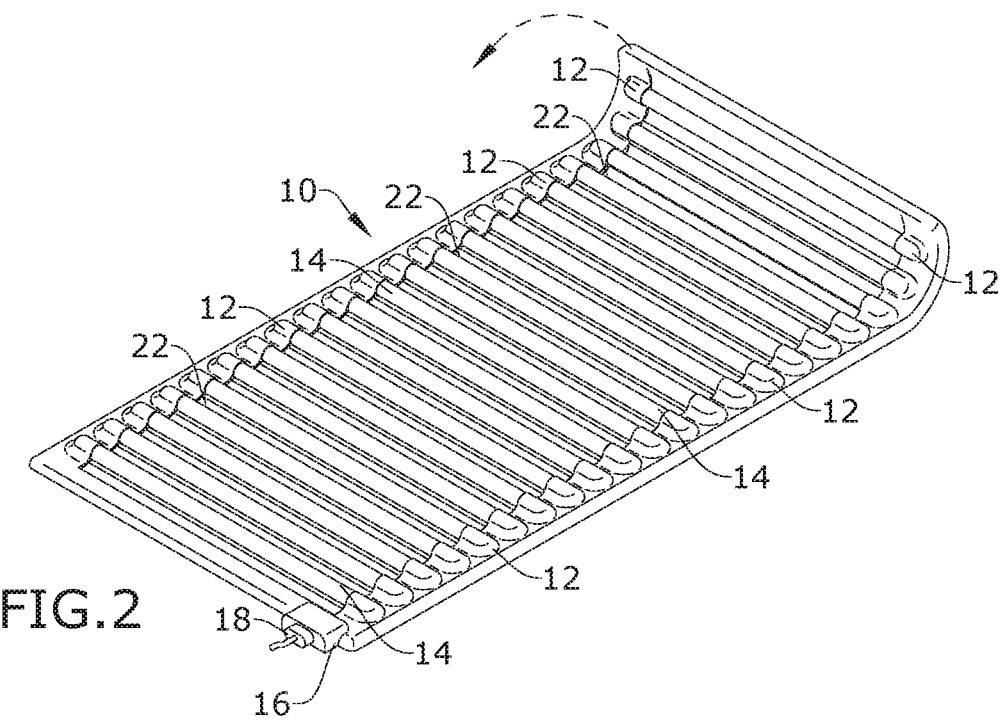
FIG. 2 is a perspective view of an exemplary embodiment of the present invention, demonstrating a partially rolled condition.
Figure 3:
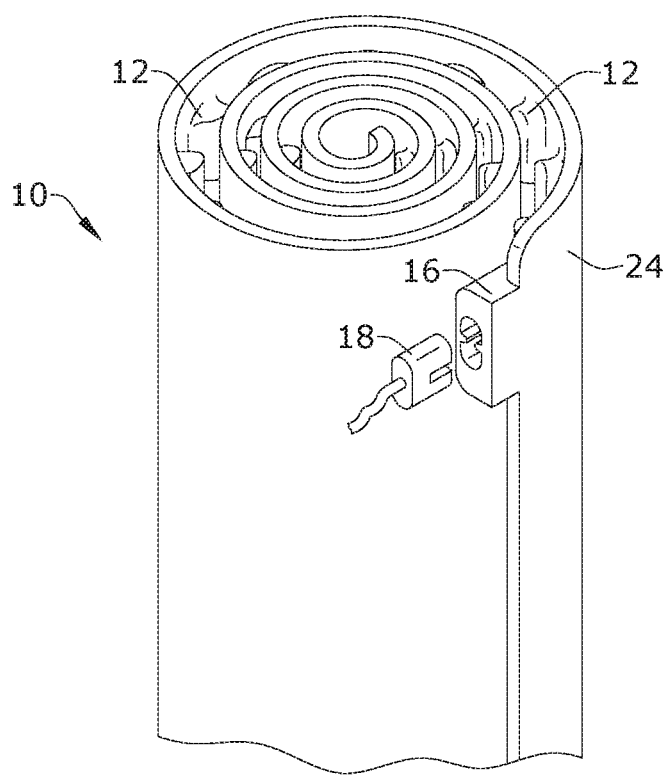
FIG. 3 is a perspective view of an exemplary embodiment of the present invention, demonstrating a rolled condition.
Figure 4:
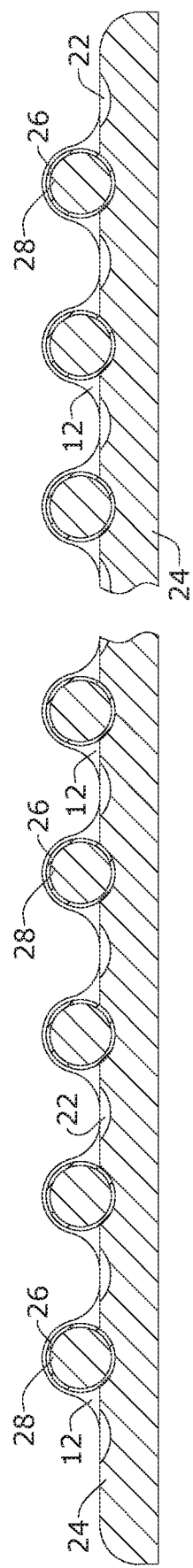
FIG. 4 is a section view of an exemplary embodiment of the present invention, taken along line 4-4 in FIG. 1.

As a result of the above, the spaced apart heating elements 28 encased in the non-stick material 26 provide a cylindrical rail configuration 14 that enables rolling the roll-up barbeque grill 10 between a rolled condition (FIG. 2) and a flat condition (FIG. 1). The rail configuration affords a void 50 between adjacent "rails" 14. The void 50 may be defined, in part, by the valley 22 disposed along the base substrate 24 between said adjacent rails 14. During the transition to the rolled condition, wherein an intermediate stage is illustrated in FIG. 2, each rail 14 and associated void 50 is dimensioned, spaced apart, and so adapted so that each rail 14 occupies or moves into the void 50, thereby enabling the rolled, condensed condition.

Figure 5:
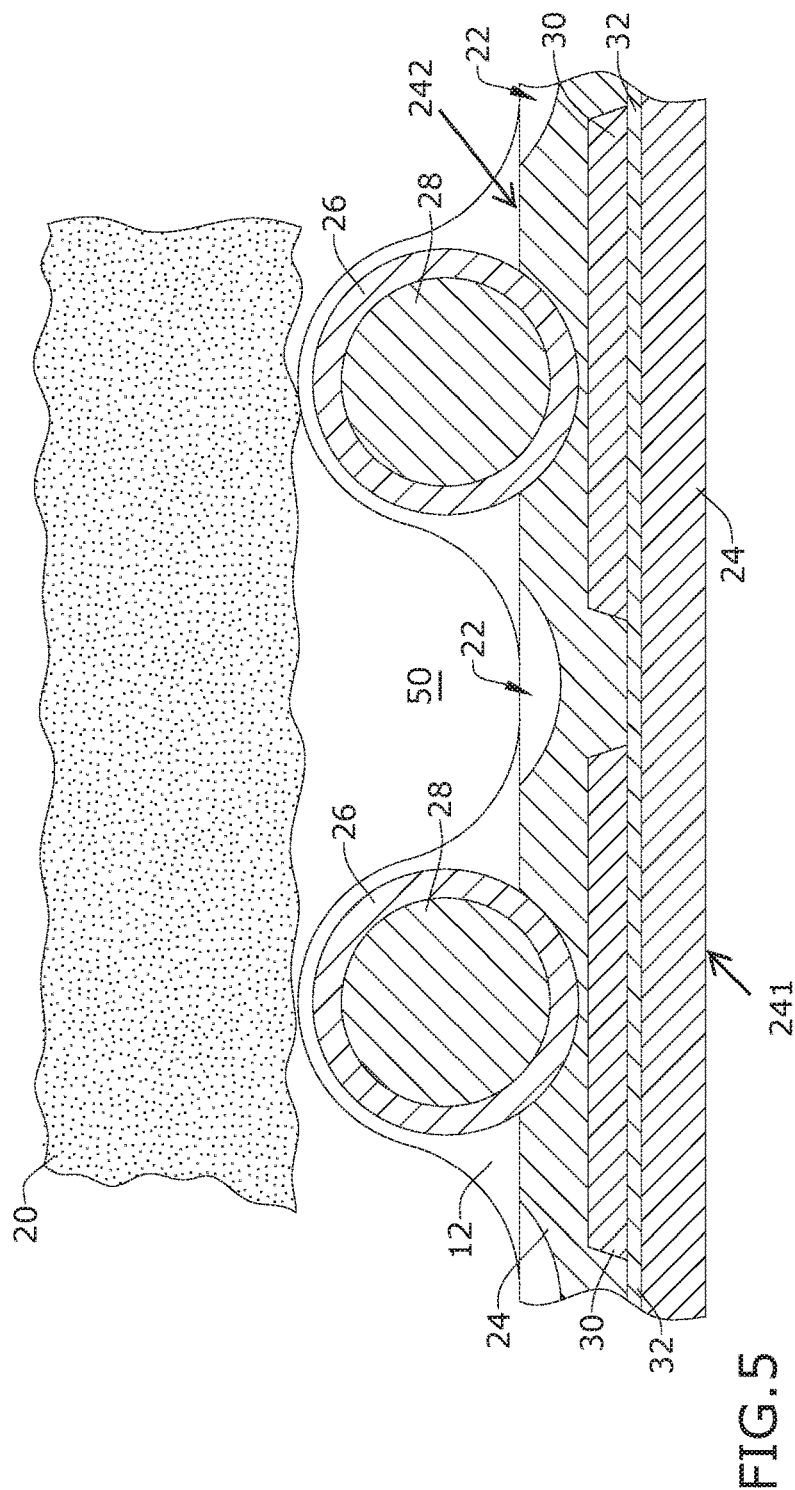
FIG. 5 is a detail section view of an exemplary embodiment of the present invention.

In certain embodiments, the heating elements 28 may not be disposed in the valleys 22, but are otherwise connected to the second surface 242. In some embodiments, a rail plate 30 may be provided below each heating element 28/rail 14, wherein the resulting rail plates 30 are disposed between the first and second surfaces 241 and 242. In one embodiment, the rail plates 30 are encased by the base substrate 24. Underneath the rail plates 30 but above the first surface 241 may be a second substrate 32, as illustrated in FIG. 5. The second substrate 32 may be made from a heat resistant material, such as Kevlar™ or the like, so that when roll up barbeque grill 10 is lain on a supporting surface in the flat condition, the heat from the heating elements 28 will not transfer to the second surface 242 or the supporting surface. In certain embodiments, the second substrate 32 may be below the first surface 241.

It should be understood by those skilled in the art that the use of directional terms such as above, upper, upward and top, and terms such as below, downwardly, under, and bottom are used in relation to the illustrative embodiments as they are depicted in the figures: the above (upper) direction being toward the top of corresponding FIGS. 1, 2, 4 and 5, and the below (lower) direction being toward the bottom of the same FIGS. 1, 2, 4 and 5.

In some embodiments, the first and second surfaces 241 and 242 are approximately 12 inches by 24 inches that provide up to twenty-two heating elements 28. Though it should be understood that such dimensions and number of heating elements 28 may be range from a third of that to three times that or more.

The present invention may include a rail cap 12 dimensioned and adapted to cover the distal ends of the rails 14, which is then molded into the base substrate 24.

Figure 6:
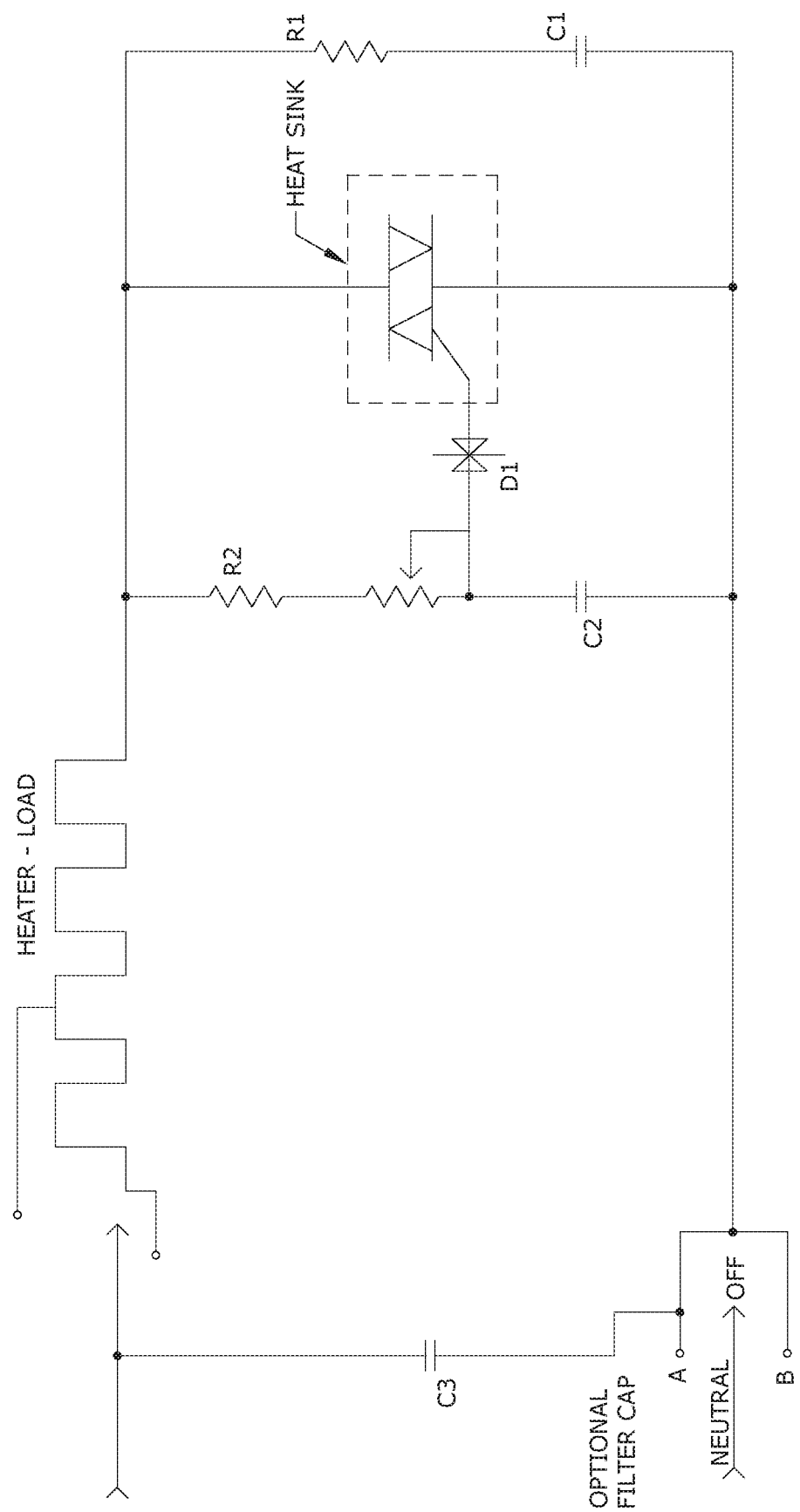
FIG. 6 is a schematic wiring diagram of an exemplary embodiment of the present invention.

The heating element 28 may be electrically connected to a power source, possibly 110 or 220 volts (not shown), through a power adapter 16 and a quick disconnect electrical connection 18, wherein the electrical wiring diagram is shown in FIG. 6.

A method of using the present invention may include the following. The roll-up barbeque grill 10 disclosed above may be provided. A user may electrically power the heating elements 28 and place food stuff 20 thereon. The valleys 22 in between the heating elements 28 are dimensioned and adapted to catch grease from the food 20, enabling smokeless cooking surface. Also, with the non-stick material 26 substantially coating the heating elements 28, cleanup is simple: the present invention can be either washed in a sink or put into a dishwasher. The user can then roll it up for easy storage. It is also very light weight and so easy to transport so that the user may cook in any environment (indoors or outdoors).

It should be understood, of course, that the foregoing relates to exemplary embodiments of the invention and that modifications may be made without departing from the spirit and scope of the invention as set forth in the following claims.

What is claimed is:

1. A roll-up barbeque grill, comprising:
    a base substrate having opposing first and second surfaces;
    a plurality of spaced apart valleys defined by the second surface in a flat condition;
    a plurality of heating element connected to alternating valleys of the plurality of spaced apart valleys;
    a void between each adjacent heating elements;
    each void defined along a lower portion by the base substrate surface and located above the valley;
    each void communicating with an external environment; and
    the base substrate rollable between the flat condition and a rolled condition, wherein said heating elements move so as to decrease a volume of an adjacent void.

2. The roll-up barbeque grill of claim 1, further comprising a non-stick material substantially covering each heat element.

3. The roll-up barbeque grill of claim 1, further comprising at least one rail cap, each rail cap dimensioned to receive one of the two distal ends of each heating elements, wherein each rail cap is molded into the base substrate.

4. The roll-up barbeque grill of claim 1, further comprising a rail plate between each heating element and the first surface.

5. The roll-up barbeque grill of claim 1, further comprising a heat resistant substrate disposed between each heating element and the first surface.

6. A roll-up barbeque grill, comprising:
    a base substrate having opposing first and second surface generally planar surfaces;
    a plurality of spaced apart valleys defined by the second surface in a flat condition;
    a plurality of heating element connected to alternating valleys of the plurality of spaced apart valleys;
    a non-stick material substantially covering each heat element;
    a void between each adjacent heating elements;
    each void defined along a lower portion by the base substrate surface and located above the valley;
    each void communicating with an external environment;
    the base substrate rollable between the flat condition and a rolled condition, wherein said heating elements move so as to decrease a volume of an adjacent void;
    two rail caps, each rail cap dimensioned to receive one of the two distal ends of each heating elements, wherein each rail cap is molded into the base substrate;
    a rail plate between each heating element and the first surface; and
    a heat resistant substrate disposed between each heating element and the first surface.

* * * * *